US010905287B2

(12) United States Patent
Tu et al.

(10) Patent No.: US 10,905,287 B2
(45) Date of Patent: Feb. 2, 2021

(54) APPLIANCE FOR FOAMING BEVERAGE OR FOODSTUFF

(71) Applicant: NESTEC S.A., Vevey (CH)

(72) Inventors: Xuan Mai Tu, Ecublens (CH); Luan Vu Tran, Vufflens-la-Ville (CH); Alexa Perrin, Savigny (CH)

(73) Assignee: Societe des Produits Nestle S.A., Vevey (CH)

( * ) Notice: Subject to any disclaimer, the term of this patent is extended or adjusted under 35 U.S.C. 154(b) by 241 days.

(21) Appl. No.: 15/746,190

(22) PCT Filed: Jul. 8, 2016

(86) PCT No.: PCT/EP2016/066268
§ 371 (c)(1),
(2) Date: Jan. 19, 2018

(87) PCT Pub. No.: WO2017/016847
PCT Pub. Date: Feb. 2, 2017

(65) Prior Publication Data
US 2018/0206678 A1    Jul. 26, 2018

(30) Foreign Application Priority Data
Jul. 24, 2015    (EP) .................................... 15178192

(51) Int. Cl.
*A47J 43/08*    (2006.01)
*A47J 43/046*    (2006.01)
(Continued)

(52) U.S. Cl.
CPC ......... *A47J 43/085* (2013.01); *A47J 31/4496* (2013.01); *A47J 43/0465* (2013.01);
(Continued)

(58) Field of Classification Search
CPC .. A47J 43/0465; A47J 27/004; A47J 43/1093; A47J 31/4485; A47J 31/4496; A47J 43/0722; A47J 43/085
See application file for complete search history.

(56) References Cited

U.S. PATENT DOCUMENTS

2015/0190015 A1* 7/2015 Ven Der Woning ......................... A47J 43/0465
366/143

FOREIGN PATENT DOCUMENTS

CN    1736013 A    2/2006
CN    101312308 A    11/2008
(Continued)

OTHER PUBLICATIONS

Chinese Office Action for Appl. No. 2016800409453 dated Jul. 3, 2020.

*Primary Examiner* — Hong T Yoo
(74) *Attorney, Agent, or Firm* — K&L Gates LLP

(57) ABSTRACT

An appliance to foam a liquid for consumption, the appliance comprising: a container mounting portion to mount thereto a container to contain said liquid; an agitation system configured to foam said liquid, said system comprising a stator arranged external a mounted container, said stator configured to generate a rotating magnetic field for transmission of torque to rotate a rotary agitator arranged in a mounted container, wherein said stator comprises at a circuit board with electrically conductive portions formed thereon.

5 Claims, 5 Drawing Sheets

(51) Int. Cl.
*A47J 31/44* (2006.01)
*B01F 3/04* (2006.01)
*B01F 13/08* (2006.01)

(52) U.S. Cl.
CPC ...... *B01F 3/04453* (2013.01); *B01F 13/0854* (2013.01); *B01F 2215/0014* (2013.01); *B01F 2215/0022* (2013.01)

(56) References Cited

FOREIGN PATENT DOCUMENTS

| | | |
|---|---|---|
| CN | 102148544 A | 8/2011 |
| CN | 103348569 A | 10/2013 |
| CN | 104567651 A | 4/2015 |
| CN | 104604100 A | 5/2015 |
| JP | H08223831 A | 8/1996 |
| WO | 2014009858 | 1/2014 |

* cited by examiner

APPLIANCE FOR FOAMING BEVERAGE OR FOODSTUFF

CROSS REFERENCE TO RELATED APPLICATIONS

The present application is a National Stage of International Application No. PCT/EP2016/066268, filed on Jul. 8, 2016, which claims priority to European Patent Application No. 15178192.9, filed on Jul. 24, 2015, the entire contents of which are being incorporated herein by reference.

TECHNICAL FIELD

The present invention relates to an appliance for the foaming of a beverage or foodstuff, the appliance comprising an agitator and a magnetic drive system for driving said agitator.

BACKGROUND

It is desirable to foam (i.e. to aerate to a froth by the trapping of air pockets) beverages or foodstuffs, or components thereof, during beverage preparation. One example is milk that is foamed with coffee added thereto to form a latté or a cappuccino. A further example is the whisking of egg whites or cream to a mousse.

Accordingly various appliances exist to automate a foaming process. An example of one such appliance is disclosed in WO 2006/050900, wherein a container for containing a liquid to be foamed has arranged therein a rotary agitator which is rotated for said foaming. In particular, the rotary agitator is part of an agitation system that further comprises: permanent agitator magnets incorporated on the rotary agitator; permanent drive magnets arranged external the container; a rotor operable to rotate said drive magnets, whereby rotation of the drive magnets effects a rotating magnetic field to transmit torque to the agitator mag nets.

In particular the rotor is driven by an electrically operated motor, which is arranged beneath the container. A drawback with such an arrangement is that the housing of the appliance has to house said motor and the drive magnets, both of which are bulky and impose size constraints on the housing, which is undesirable for reasons material wastage and economy of space on a worktop. A further drawback is that said drive magnets are limited in the amount of torque they can apply to the whisk by virtue of their degree of magnetisation.

SUMMARY OF THE INVENTION

An object of the invention is to provide an appliance with an agitation system which is more compact.

It would be advantageous to provide an agitation that is cost effective to manufacture and/or assemble.

It would be advantageous to provide an agitation capable of applying high torque to a rotary agitator.

Objects of the invention are achieved by: the appliance according to claim 1 and the method according to claim 15.

Disclosed herein according to a first aspect of the invention is an appliance (e.g. for home use by an end user) to foam (e.g. to aerate or froth) a liquid for end user consumption, the appliance comprising: a container mounting portion to mount thereto (e.g. removably or permanently mounted) a container to contain said liquid; an agitation system configured to foam said liquid, said system comprising a stator arranged external a mounted container (e.g. beneath a base of a mounted container), said stator configured to generate a rotating magnetic field for transmission of torque to rotate a rotary agitator arranged in a mounted container, wherein said stator comprises at a circuit board with electrically conductive portions formed thereon. The rotary agitator and stator thus form an electric motor. The rotating magnetic field thus extends into a mounted container and rotates therein.

Accordingly the object of the invention is achieved since the stator of the appliance is particularly compact in comparison to the prior art, which comprises arranged within the appliance a motor driving permanent magnets. Moreover, a stator formed with electrically conductive portions on a circuit board can be conveniently and precisely formed when compared to a coiled wire arrangement. Furthermore it has enhanced heat dissipation.

The stator may be generally disc shaped. The stator may be arranged generally perpendicular to the axis of rotation of said field. The stator preferably extends parallel to a base of a mounted container. Advantageously the arrangement is compact. The circuit board(s) comprise a non-conductive material, such as polyethylene terephthalate (PET) or glass fibre reinforced (fiberglass) epoxy resin. The electrically conductive material generally comprises a metal, such as copper. The electrically conductive material can be formed on the circuit board(s) by known means, e.g. etching or printing. Advantageously the electrically conductive portions are formed conveniently with a high level of precision.

The stator may comprise one or a plurality (e.g. and number between 1 and 20, such as 2, 3, 4, 6) of said circuit board, whereby the plurality of said boards are arranged in the form of a stack (e.g. layered in a generally of fully overlapping arrangement), preferably with the centres thereof aligned to the axis of rotation of the field. The plurality of circuit boards are fixed together, e.g. bonded, to form a laminate. Advantageously the plurality of boards enables a high current density in the stator and thus a high magnetic field strength for transmission of high torque. The stator may comprise a circuit board with electrically conductive portions formed on one or both faces of the circuit board. Advantageously forming the electrically conductive portions on both faces of a circuit board enables a high current density in the stator and thus a high magnetic field strength for transmission of high torque. In the example wherein there is a plurality of circuit boards with adjacent faces thereof comprising electrically conductive portions an electrical insulator, e.g. an isolant such as a glass fibre, epoxy resin, is preferably arranged between the circuit boards.

The electrically conductive portions may be connected with a multiphase configuration, e.g. 2, 3, 4, 5, 6 or other suitable number of phases. Preferably a 3 phase configuration us utilised. A phase herein is defined conventionally with respect to electrically operated motors, e.g. each phase comprises an independent arrangement of electrically conductive portions arranged to generate a static magnetic field at a particular position when a current travels therethrough. A rotating magnetic field is achieved by sequentially switching the current through the phases, e.g. a phase is switched on by the application of current with a square wave or other suitable waveform. The electrically conductive portions of each phase may be arranged to be multipolar, e.g. with 2, 3, 4, 5 or other suitable number of pole pairs. Advantageously, having multiple pole pairs enables smooth torque delivery, and in particular a complex arrangement of many poles can be conveniently and precisely formed on the circuit boards using one of the aforesaid methods. The said multiphase, multipolar configuration is preferably configured to generate a rotating magnetic field to transmit torque to a corresponding multipolar permanent magnet arrangement of the rotary agitator arranged in the container.

The electrically conductive portions of each phase may be complimentary in shape (e.g. active portions thereof have a substantially similar shape) to each other and may be rotationally offset to each other, e.g. a 3 phase, 8 pole (i.e. 4 pole pairs) configuration, wherein each phase is rotationally offset by 30 degrees. Advantageously each phase can be conveniently formed using the same process (e.g. template) and then rotationally offset during assembly to define the separate phases.

Each phase may be arranged such that a face of the circuit board(s) comprising a phase comprises a single phase only, e.g.: each phase is arranged on one face only and not on any other faces; or each phase is distributed over a plurality of faces with each of said plurality of faces only comprising one phase only. Advantageously a phase can be layered over several faces (e.g. 2, 3, 4, or more) to achieve a high current density in the stator and thus a high magnetic field strength for transmission of high torque.

With an arrangement with the phases disposed over several faces of the circuit board(s), the phases (e.g. each of the faces of a phase) may be symmetrically disposed about a central plane, the central plane being arranged centrally in a through-thickness direction of the circuit board(s), e.g.: a 2 phase arrangement wherein there are two boards, phase 1 is arranged on the outer faces thereof and phase 2 is arranged on the inner faces thereof; a 3 phase arrangement wherein there are three boards, phase 1 is arranged on the outer faces thereof, phase 2 is arranged on the inner faces of the outer boards, and phase 3 is arranged on the faces of the central board. The said symmetrical arrangement may also be extended to configurations wherein more than one phase is arranged on a face, e.g.: a phase arrangement wherein there is a single board and phase 1 and phase 2 are evenly distributed across both faces (it will be appreciated that such an arrangement is achievable by having on each face alternating active portions of each phase, which may be serially connected between the board). In the instance of there being more than one board, the central plane is arranged at the centre of the laminate.

Advantageously, with the aforedescribed symmetric arrangement of the phases the magnetic field strength at the rotary agitator is substantially the same for each phase, which result in a more uniform transfer of torque to the rotary agitator together with increased efficiency. With such an arrangement it is preferable for reasons of complexity that a face comprises one phase only, however as previously discussed the said symmetric arrangement of the phases is also possible when a face comprises more than one phase.

The electrically conductive portions are preferably arranged into active portions, whereby each active portion is configured to generate a pole for said torque transmission. An active portion can be defined as a generating a north pole or a south pole of a pole pair for torque transmission. Generally the active portions are circumferentially and equidistantly disposed on a face of a circuit board about the axis of rotation of the magnetic field. Generally each active portion comprises one of two predetermined arrangements.

The electrically conductive portions may comprise vias for connection (e.g. for interconnection of phases disposed over several faces and/or for transmission of current to and from the stator) arranged distal the active portions (i.e. they are not arranged within an active portion). In particular the vias can be proximal a periphery of the circuit boards and/or proximal a centre of the circuit boards. Generally the vias may be the through extending type. Advantageously the efficiency of the active portions is enhanced since the vias do not interfere with their positioning/arrangement, and thus magnetic field generation.

For phases that are distributed over several layers, the active portions that comprise a phase that are arranged on different faces are preferably configured such that superposed active portions generate a magnetic field vector in the same direction. The said direction may alternate between adjacent superposed active portions to define a plurality of poles. In particular, the different faces comprising a phase each have substantially the same shape of active portion and are rotationally offset by an amount corresponding to (or substantially) an active portion, e.g. a 3 phase, 8 pole (i.e. 4 pole pairs) configuration, wherein each face is rotationally offset by 45 degrees. Advantageously, a phase can be conveniently formed using the same template of the active portions, each face is then rotationally offset by an active potion in the board laminate. The active portions may be arranged with either a first or second shape. Superposed active portions may comprise active portions of the first and second shape. On a face the adjacent active potions may alternate between the first and second shape.

The active portions may comprise a plurality of tracks. An active portion may comprise two generally radially (e.g. exactly radial or radial ±10 or 5 degrees) extending portions which are interconnected (e.g. by interconnecting portions which may be generally circumferentially arranged). Adjacent active portions preferably share the same radially extending portion. The phases may be arranged between faces such that the radially extending portions are generally aligned and overlapping, and which are preferably connected with the current traveling there through in the same direction. Advantageously a high current density is achieved. The active portions on a face may comprise interconnections of the radial portions alternating between proximal a periphery and a centre of the circuit board, i.e. to form a first and second shape, which is generally a C shape. Superposed active portions may comprise radially extending portions that are interconnected on a face proximal a periphery of the board, and complimentary radially extending portions that are interconnected on another face proximal a centre of the board.

The optionally tracks of the active portions may be 0.25-2 mm in thickness (i.e. in the planar direction of the stator). The optionally tracks of the active portions may be narrower in thickness and more densely packed along the radially extending portions rather than the interconnecting portions, e.g. they are less than 50% or 75% of the thickness at the interconnection portions. Advantageously, the increased width of the interconnecting portions enables improved heat dissipation.

The stator may extend over a substantial portion of a base of a mounted container, e.g. an overlap of at least 90% or all of the area of the base of a mounted container. Advantageously, the magnetic field is generated over a large surface area and can thus induce a large amount of torque in the rotary agitator. The stator preferable extends parallel to a base of a mounted container. The stator is preferably arranged adjacent a base of the container, e.g. a mounted container sits is at least partially supported by the stator, and sits on the stator with an optional insulating material therebetween.

The container mounting portion may be configured for permanent or removable attachment of the container, e.g. a bonded, force fit, or screw fit. Advantageously a container which is removable can be removed for cleaning. An exterior surface of the stator proximal the container may comprise a protective coating for mounting the container thereon. Advantageously, the appliance is compact.

The appliance may comprise a container to contain said liquid for mounting to said mounting portion (e.g. it may be mounted to the mounting portion). The appliance may comprise a rotary agitator for arrangement in said container (e.g. it may be arranged in said container), wherein the rotary agitator comprises one or more agitator magnets defining magnetic poles for transmission of torque from the magnetic field generated by the stator to the rotary agitator (e.g. the other components of the rotary agitator).

The container may comprise at a base thereof a location member for location of the rotary agitator. The location member is preferably located such that when the container is mounted it is at a centre of rotation of the magnetic field.

The rotary agitator may comprise an array of magnetic poles circumferentially disposed about an axis of rotation. The poles may be formed of discrete magnets, e.g. magnets that comprises single pole pairs, or magnets that comprise a plurality of pole pairs.

Disclosed herein according to a second aspect of the invention is a method of foaming a liquid for consumption using the appliance according to any feature of the first aspect, said method comprising: generating a rotating magnetic field by applying electrical energy to electrically conductive portions of a stator formed on a circuit board; rotating a rotary agitator arranged in a container for container liquid by applying a torque from said field to the rotary agitator. The method may comprise filling the container with liquid to be foamed. Generating a rotating magnetic field may comprise sequentially switching the electrical current between the phases of the stator, e.g. by means of a processor.

Disclosed herein according to a third aspect of the invention is a stator for an electrically rotating machine. The stator for the aforesaid electrical rotating machine may comprise any feature according to the first aspect of the invention. The electrical rotating machine may comprise a motor, such as a pancake or axial rotor motor. The electrical rotating machine may comprise an electrical generator. The electrical rotating machine may comprise the appliance according to the first or second aspect.

Disclosed herein according to a fourth aspect is an electrical rotating machine comprising the stator according to the third aspect. The electrical rotating machine may comprise a motor, such as a pancake or axial rotor motor. The electrical rotating machine may comprise an electrical generator. The electrical rotating machine may comprise the appliance according to the first or second aspect.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

For a better understanding of the invention, and to show how embodiments of the same may be carried into effect, reference will now be made, by way of example, to the accompanying drawings in which.

DETAILED DESCRIPTION OF EXEMPLARY EMBODIMENTS

Appliance for Foaming

Figure 1:
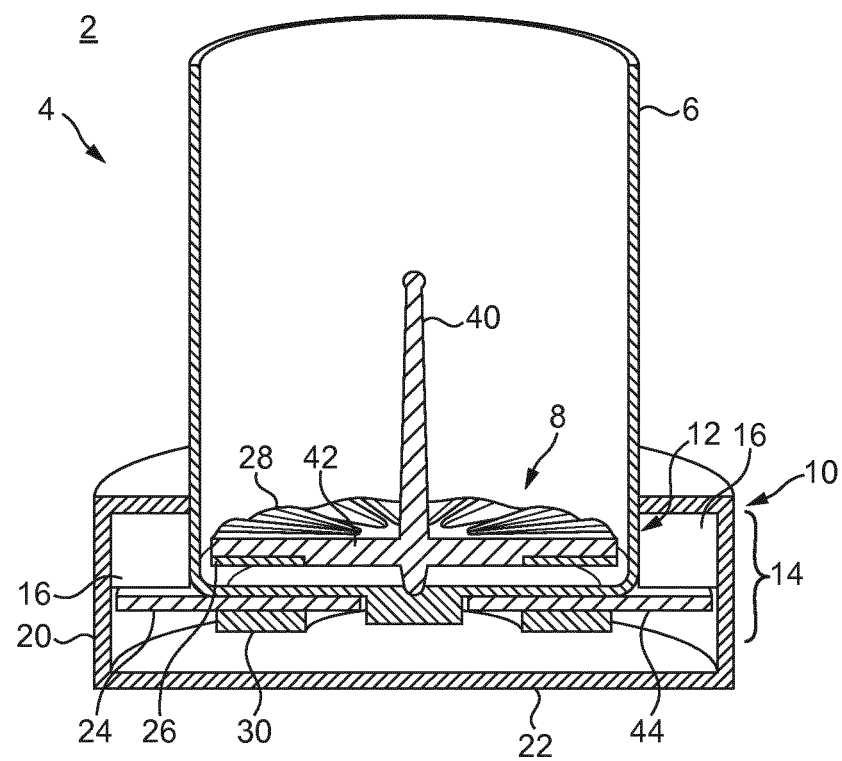
FIG. 1 is an illustrative sectional view of an embodiment of an appliance to foam a liquid for end user consumption.

An appliance for foaming 2, an example of which is illustrated in FIG. 1, comprises at a first level thereof: a base unit 4 to transmit torque to a rotary agitator; a container 6 to contain liquid for end user consumption; a rotary agitator 8 to foam said liquid, which are described sequentially as follows.

Base Unit

The base unit 4 transmits torque to the rotary agitator 8 by means of a magnetic field, and comprises at a first level thereof: a housing 10; container mounting portion 12; agitation system 14; optionally a heater 16; control system 18, which are sequentially described as follows.

Housing

The housing 10 houses and supports said first level components and comprises: a base 22 for abutment of a horizontally arranged support surface; a body 20 for mounting thereto the other first level components.

Container Mounting Portion

The container mounting portion 12 is operable to mount the container 6 to the base unit 4. The container mounting portion 12 may be configured for permanent mounting of a container, e.g. it comprises a surface for locating the container to which the container can be bonded. Preferably the container mounting portion 12 is configured for removable attachment to the container, e.g. it comprises a force fit or screw fit. An advantage of a removable attachment is that the container 6 can be detached from the base unit 4 for cleaning. The mounting portion 12 may comprise the stator with an optional a protective coating (e.g. an insulating lacquer or a glass fibre epoxy resin) on an outer surface thereof for mounting the container 6 thereon.

Agitation System

The agitation system 14 is operable to foam liquid in the container 6 by mechanical agitation, in particular by transmission of torque via a magnetic field to a rotary agitator 8, and comprises: a stator 24; a rotary agitator 8; an optional core 30.

The stator 24 is operable to receive phased electrical energy and to generate therefrom a rotating magnetic field. The stator 24 comprises at least one circuit board with electrically conductive portions formed thereon and is discussed in more detail later on.

The rotary agitator 8 comprises an array of magnetic poles that are circumferentially disposed about an axis of rotation for interaction with the rotating magnetic field generated by the stator 24. Agitator magnets 26 of the rotary agitator 8 form said poles and comprise a magnetically hard material capable of a persistent magnetic field. The magnets 8 are configured the transmission of torque derived from their interaction with the rotating magnetic field to the remainder of the rotary agitator 8. The magnets 26 may comprise discrete units with each comprising a north and south pole. Alternatively one or more of the units may be integrated, e.g.

in an annular ring. Other components of the rotary agitator 8 are discussed in more detail later on.

The optional core 30 is for enhancing the rotating magnetic field and typically comprises a ferromagnetic metal such as iron. The code 30 is in general an axially arranged toroid or annular ring positioned proximal a face of the stator 24 that is distal the container 6.

Heater

The optional heater is operable to 16 heat the liquid in the container 6. Preferably the heater 16 comprises an induction coil operable to heat by electromagnetic induction the rotary agitator 8. Alternatively it may heat the container 6, e.g. the heater comprises a resistive element for heating by conduction.

Control System

Figure 2:
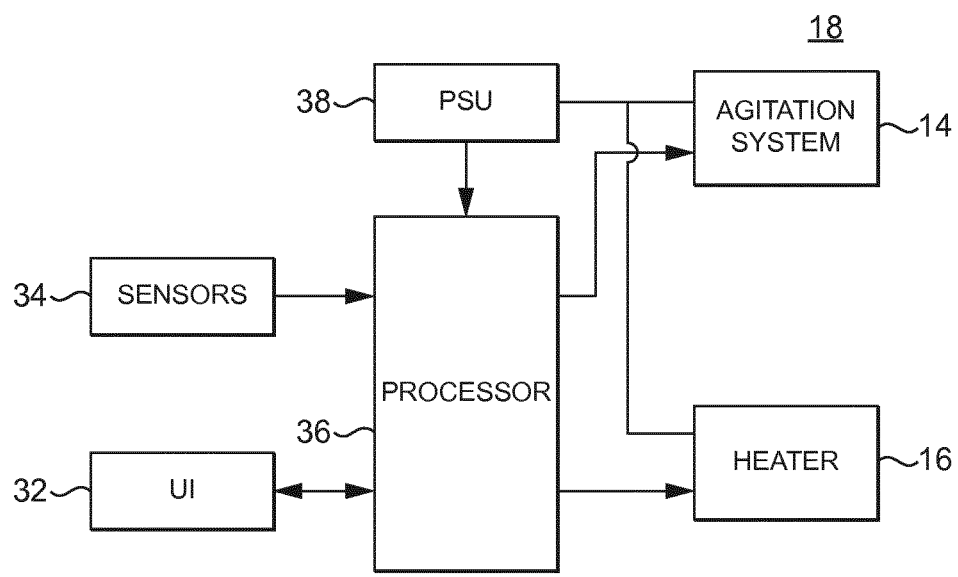
FIG. 2 is block diagram of a control system for the appliance of FIG. 1.

The control system 18, an example of which is illustrated in FIG. 2, is operable to control the agitation system 14 and optional heater, and generally comprises: a user interface 32; optional sensors 34; processor 36; power supply 38, which are described sequentially.

The user interface 32 comprises hardware to enable an end user to interface with the processor 36 and hence is operatively connected thereto. More particularly, the user interface receives commands from a user; a user interface signal transfers the said commands to the processor 36 as an input. The commands may, for example, be an instruction to execute a foaming process and/or a heating process. The hardware of the user interface 32 may comprise any suitable device(s), for example, the hardware comprises one or more of the following: buttons, such as a joystick button or press button; joystick; LEDs; graphic or character LDCs; graphical screen with touch sensing and/or screen edge buttons.

Optional sensors 34 are operatively connected to the processor 36 to provide an input for monitoring said process. The sensors 40 typically comprise one or more of the following: liquid temperature sensors; liquid level sensors; position sensors (e.g. hall sensors) for sensing a position of the magnets of the rotary agitator 8 with respect to the stator as will be discussed.

The processor 36 is generally operable to: receive an input, i.e. the commands from the user interface 32 and/or from the sensors 34; process the input according to program code stored on a memory unit (or programmed logic); provide an output, which is generally the said foaming process and/or a heating process. The process may be executed with open-loop control, or more preferably with closed-loop control using the input signal from the sensors 34 as feedback. The processor 36 generally comprises memory, input and output system components, which are arranged as an integrated circuit, typically as a microprocessor or a microcontroller. The processor 36 may comprise other suitable integrated circuits, such as: an ASIC; a programmable logic device such as an FPGA; an analogue integrated circuit such as a controller. The processor 36 may also comprise one or more of the aforementioned integrated circuits, i.e. multiple processors. An example of a suitable component of a processor for stator control is the ESCON 36/3 motor controller by Maxon, which may be controlled by a further processor.

The processor 36 generally comprises a memory unit for storage of the program code and optionally data. The memory unit typically comprises: a non-volatile memory e.g. EPROM, EEPROM or Flash for program code and operating parameter storage; volatile memory (RAM) for data storage. The memory unit may comprise separate and/or integrated (e.g. on a die of the processor) memory.

The power supply 38 is operable to supply electrical energy to the processor 36, agitation system 14 and heater 16. The power supply 38 may comprise various means, such as a battery or a unit to receive and condition a mains electrical supply.

Container

The container 6, and example of which is illustrated in FIG. 1, is operable to contain the liquid for foaming. Typically the container has a capacity of 0.2-0.5 litres. The container 6 may be cylindrical (6). The container is generally formed of a material that is suitably transparent to a magnetic field, e.g. glass.

The liquid to be foamed in the container is generally any potable liquid including foodstuffs. Typically it is milk or comprises milk.

Rotary Agitator

The rotary agitator 8, an example of which is illustrated in FIG. 1, is operable to rotate to agitate the liquid in the container 6 to effect its foaming. The rotary agitator 8 comprises: an axially extending body 40; a support portion 42, radially extending from said body 40 for supporting the agitation portion 28 and the agitator magnets 26. The agitation portion 28 may be contoured (as illustrated) or otherwise formed (e.g. comprising holes) to effect fluid agitation upon rotation. The body 40 comprises at an end thereof a location member configured to engage with a complimentary location portion of the container 6, e.g. an extension on one of the body 40 or container 6 for insertion into a cavity on the other of the body 40 or container 6.

The arrangement and pole configuration of the agitator magnets 26 of the rotary agitator 8 is complementary to the poles of the stator 24, e.g. for the later discussed example stator configuration shown in FIGS. 3 and 4, wherein the stator comprises 8 poles, i.e. 4 pole pairs, there are the same number of poles in the rotary agitator, which are arranged at a complimentary radial distance from the centre of rotation of the magnetic field.

Stator

Figure 3A:
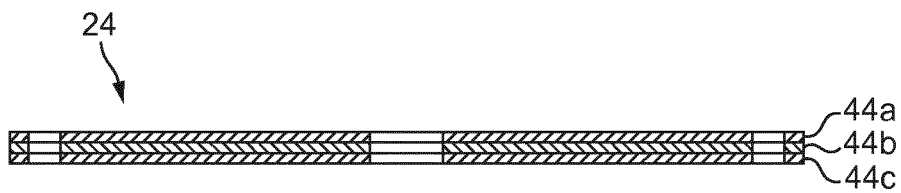
FIGS. 3a-3c show various views of an embodiment stator of an agitation system of the appliance of FIG. 1.
Figure 3B:
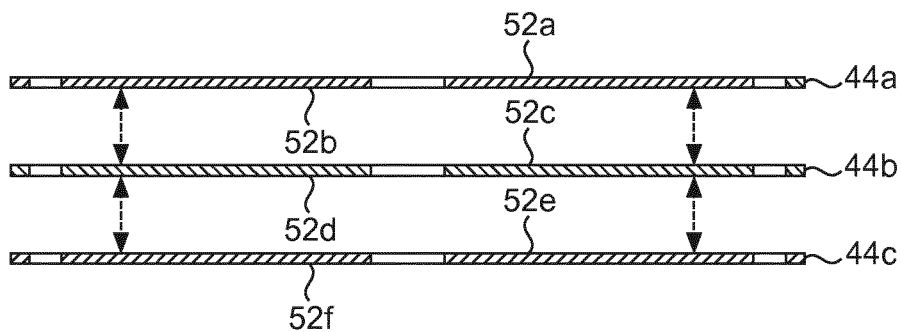
Figure 3C:
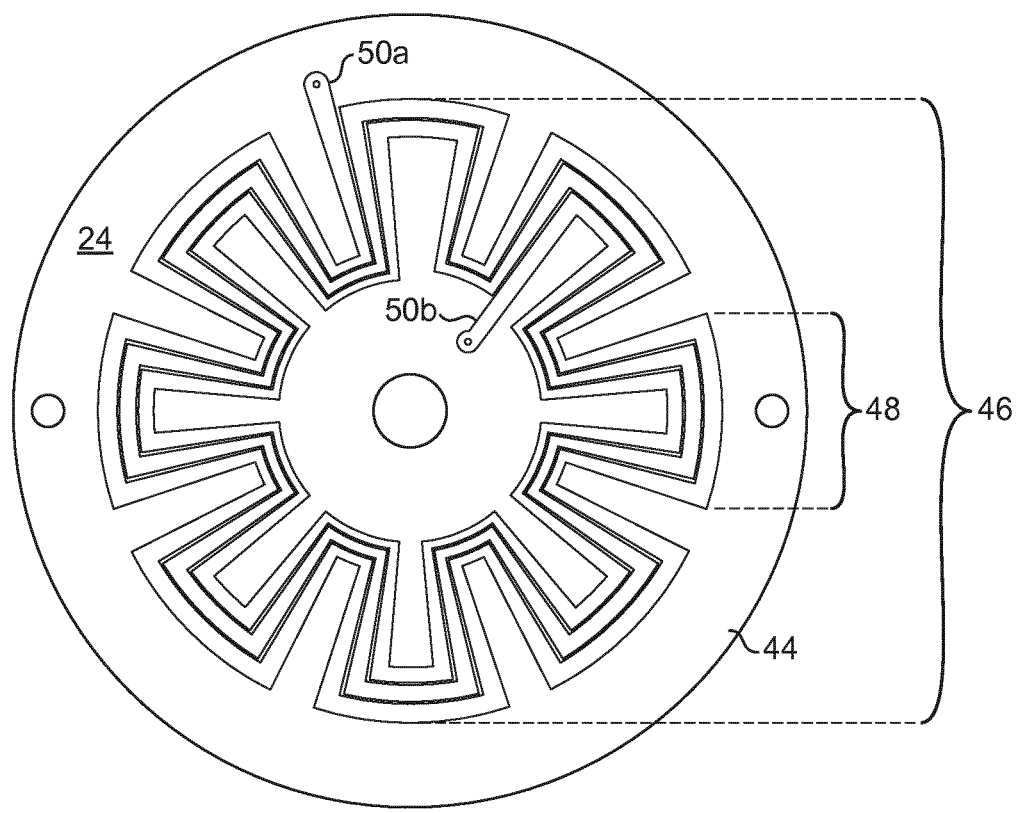

The stator 24, an idealisation of which is shown in FIG. 3, comprises a circuit board 44 and electrically conductive portions 46 arranged thereon. The stator 24 may be arranged proximal a base of the container 6 such that it is in operative proximity to the rotary agitator 8, and example of such an arrangement is shown in FIG. 1. In particular, it may fully or at least partially overlap (e.g. by covering at least 80% or 90% of the surface area of the base) said base of the container 6. Typically the stator 24 is disc shaped with the axis of rotation of the associated magnetic field arranged at a centre thereof, however it will be appreciated that it may comprise other shapes. The diameter of the stator (when in disc form) may be 5 cm-15 cm. The thickness of an individual circuit board is selected for suitable thermal conduction, e.g. 1-2, such as 1.6 mm±0.15 mm.

The electrically conductive portions 46 and circuit board(s) 44 may have various configurations as will be discussed. They are arranged to effect a multipolar (e.g. 2, 3, 4, 6 or more pole pairs), multiphase (e.g. 2, 3, 4 or more phase) motor configuration, which incorporates a rotor comprising the agitator magnets 26 of the rotary agitator 8. More particularly, the stator and rotor are configured to effect a brushless DC or AC synchronous motor configuration. The electrically conductive portions 46 are arranged to define active portions 48 for generation of the magnetic poles. The poles are connected in phases, whereby the individual phases can be switched sequentially to effect rotation of a magnetic field. In particular and active portion is configured to generate one pole (i.e. with a magnetic field vector which is in the north or south direction) of a pole pair.

In a first embodiment stator (not shown) the electrically conductive portions 46 are arranged on one face of a signal circuit board 44. As an example, they are arranged with the active portions thereof extending circumferentially and sequentially in phase order, e.g. a 3 phase configuration, with phase 1, 2, 3 circumferentially extending.

In a second embodiment stator (not shown) the electrically conductive portions 46 are arranged on both faces of a single circuit board 44. As an example, the aforesaid arrangement for a single face is repeated on both faces of said board 44.

In a preferred third embodiment stator, an example of which is shown in FIG. 3, the stator comprises a plurality of said circuit boards, whereby said boards are arranged in the form of a stack, whereby the electrically conductive portions 46 are formed on one or both sides of the associated circuit boards 44. It will be appreciated that adjacent faces of said boards can be electrically isolated by means of an electrically insulating coating such as a glass fibre epoxy resin, e.g. prepreg TU-768 or TU-768P by Taiwan Union Corporation Technology. In the example the stack comprises 3 boards, 44A, 44B, 44C, it will be appreciated that any suitable number of boards can be utilised, e.g. 4 or 6. In the following, further exemplary arrangements of the preferred third embodiment will be discussed.

Figure 4A:
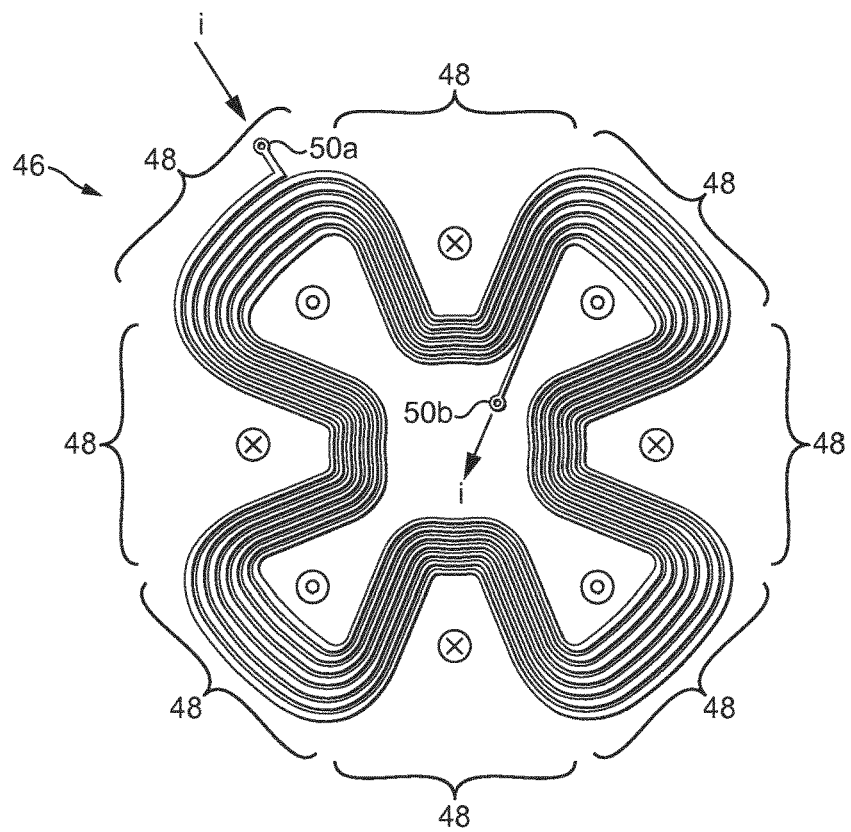
FIGS. 4a-4e show plan views of embodiment arrangements for electrically conductive portions of the stator of FIG. 3, in particular the arrangements may in one example be taken as being to scale, i.e. 1.1.

The electrically conductive portions 46 of different faces are interconnected by vias 50 thereof, which are preferably arranged distal said active portions 50 (i.e. a connecting portion of an electrically conduction portion 46 connects a via 50 with an active portion 48). More particularly, the vias 50 can be arranged proximal a periphery of the circuit boards 44 and/or proximal a centre of the circuit boards 44. The vias 50 are generally of the through hole type (e.g. extending through one or more circuit boards), however other suitable arrangements are envisaged, e.g. a blind, castellated hole type. An example of such an arrangement is shown in FIG. 4a, whereby via 50A is proximal a periphery and via 50B is proximal a centre of the board 44.

The electrically conductive portions 46 are generally complimentary in shape, i.e. each face comprises the same arrangement, but to achieve the different phases the faces are rotationally offset. As an example of such an arrangement (not shown) two circuit boards have arranged on three faces different phases, with each phase having 8 active portions providing 4 pole pairs, and being rotationally offset from the first phase by 30 degrees.

In the following the third embodiment is described has having only one phase on a face (however in a more complex example it will be appreciated that more than one phase could be arranged on a face). In the last example of the third embodiment, a phase was arranged on a single face, however in a preferred example of the third embodiment a phase may be distributed over a plurality of faces, e.g. 2, 3 or 4 faces. In this way complementary active portions 48 can be layered to increase current density and field strength.

FIGS. 3a and 3b illustrate such a preferred example, wherein there are three circuit boards 44A, 44B, 44C, with the electrically conductive portions 46 arranged on each face, i.e. utilising all 6 faces (it will be appreciated that 6 circuit boards may alternatively be used with a single face of each utilised) to define 3 phases. In particular: phase 1 is arranged on the outer faces 52A, 52F of the outer circuit boards 44A, 44C; phase 2 is arranged on the inner faces 52B, 52E of the outer circuit boards 44A, 44C; phase 3 is arranged on the faces 52C, 52D of the inner circuit board 44B. In this way each phase is symmetrically disposed about a central plane, which in this example is centrally though the inner circuit board 44B. It will be appreciated that the said symmetric arrangement can be extended to different numbers of circuit boards 44 and phase arrangements, e.g. a four phase arrangement arranged with a phase over two faces and four circuit boards 44 with both faces used. The symmetric arrangement is advantageous since the strength of the magnetic field at the rotary agitator 8 is balanced, which would not be the case if for example a first phase was arranged on the two faces most proximal the rotary agitator, and a third phase was arranged on the two faces most distal the rotary agitator 8.

Figure 4B:
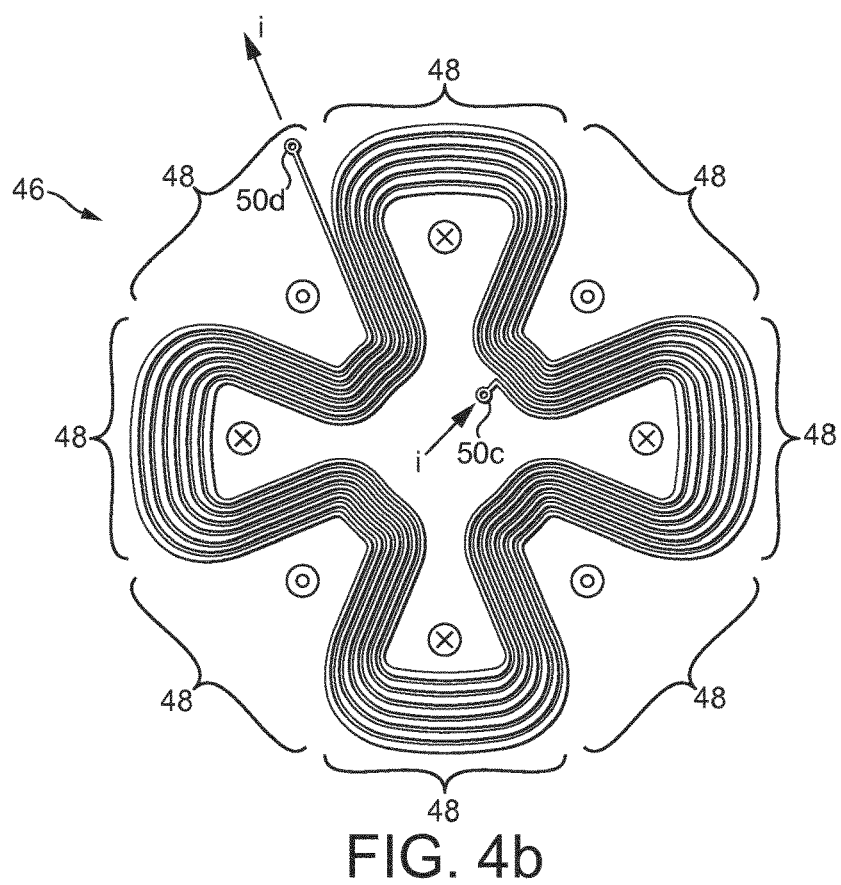
Figure 4C:
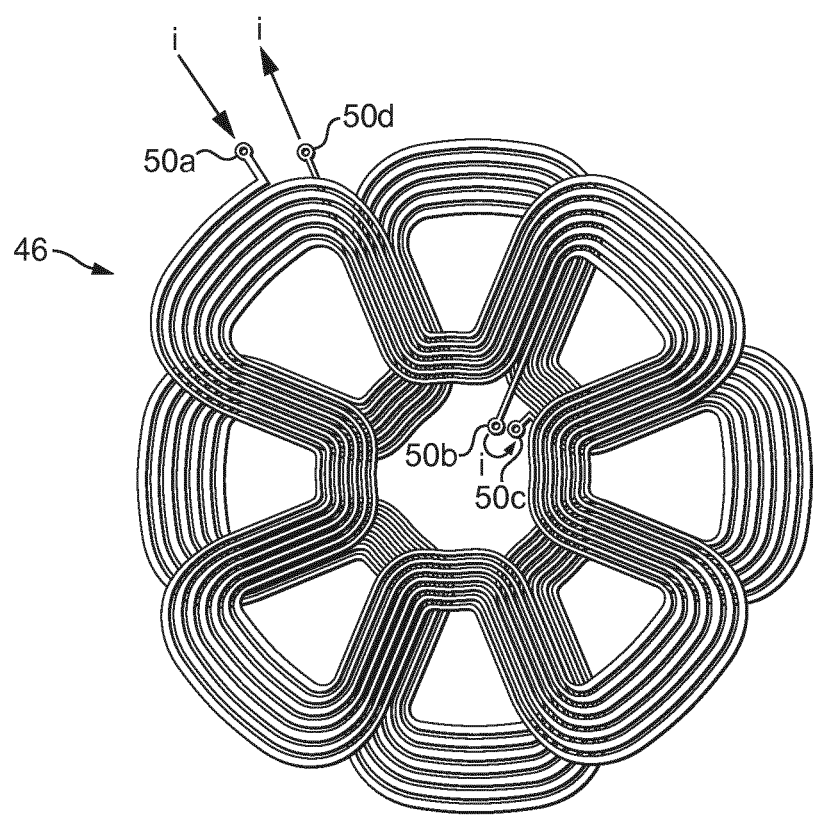
Figure 4D:
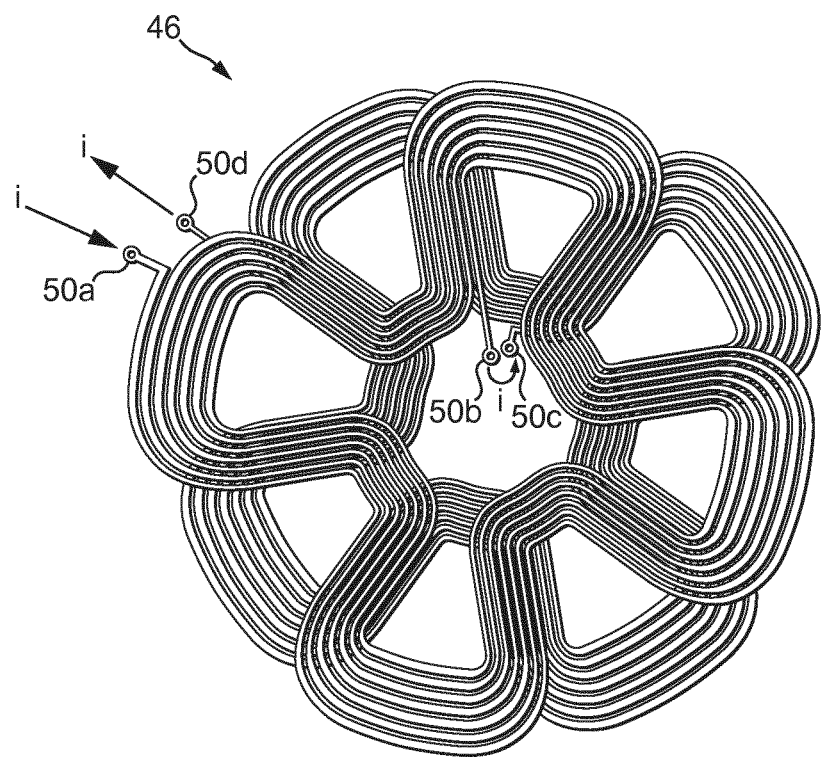
Figure 4E:
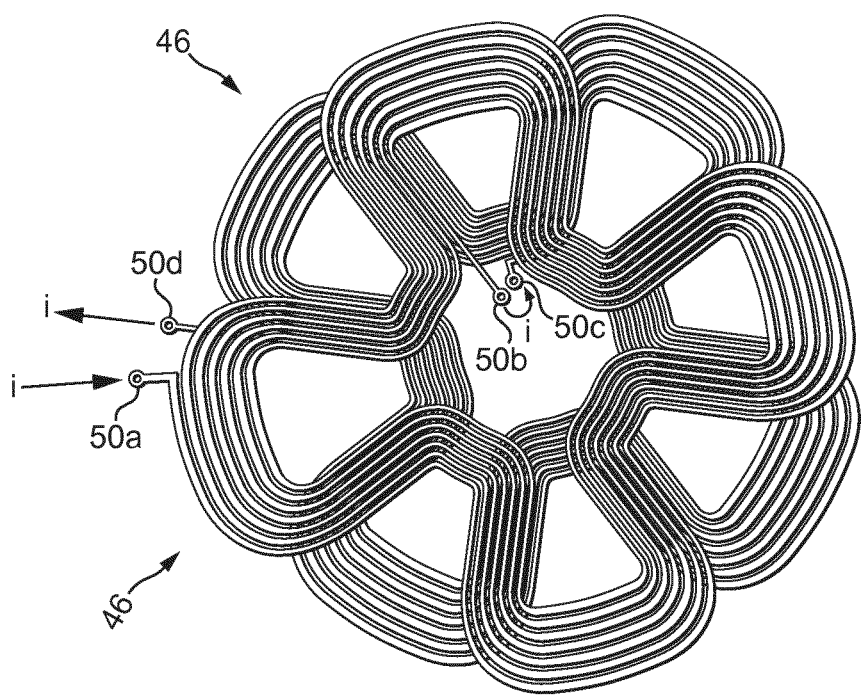

Considering the arrangement of the active portions 48 in more detail, when a phase is split over several faces the superposed active portions 48 of the same phase, which are arranged on different faces, are generally complimentary (i.e. they generate a pole with a magnetic field vector of the same direction). The other phases can be arranged in the same manner as per the first phase, but rotationally offset therefrom. Referring to the example in FIG. 4 to illustrate this arrangement: the two electrically conductive portion arrangements that comprise phase 1 are shown in FIGS. 4a and 4b, FIG. 4c shows their supposition; phase 2 comprises the same arrangement, but rotated through 30 degrees, the supposition of the two electrically conductive portion arrangements that comprise phase 2 are shown in FIG. 4d; phase 3 comprises the same arrangement, but rotated through 60 degrees, the supposition of the two electrically conductive portion arrangements that comprise phase 3 are shown in FIG. 4e.

The active portions 48 are configured to generate a magnetic field vector in a first direction, or are configured to generate a magnetic field vector in a second direction, whereby said configurations alternate on a face to define a plurality of poles. Referring to the example phase shown in FIGS. 4a and 4b: FIG. 4a comprises 8 active portions, whereby the electrical energy (as indicated in the figures by the direction of the current I according to conventional flow notation) is transmitted thereto at via 50A and therefrom at via 50B, accordingly the field vector at the active portion 48 most proximal via 50A is out of the page in the associated region (as indicated), and into the page at the most proximal active portion 48 in the anticlockwise direction and so on as indicated; the active portions 48 of FIG. 4b are connected to those of FIG. 4b by means of the vias 50B and 50C hence the current is in a different circumferential direction such that the field vector is in the same direction in the superposed active portions shown in FIG. 4c. Accordingly, in the example the active portions 48 of the associated faces of a phase are rotationally offset by an amount corresponding to an active portion and the active portions between said faces are interconnected such that a current there through is in an opposed direction such that the magnetic field vector generated by superposed active portions is in the same direction.

Generally an active portion 48 comprises two substantially radially extending portions that are interconnected by interconnecting portions. The said radially extending portions are typically 1-2 cm in length and 0.5-1 cm in width. The said radially extending portions comprise a plurality of tracks to control the current flow direction, typically there are 5-10 tracks. In particular the tracks may vary in width, for example, as illustrated in FIG. 4, the tracks are narrower and more densely packed along the radially extending portions. Advantageously, the increased width of the interconnecting portions enables improved heat dissipation.

As shown in FIG. 4a, a radially extending portion is shared between adjacent active portions 48 on the same face. Moreover, the radially extending portions are interconnected alternating between proximal a periphery and a centre of the board, e.g. to form a U shape, whereby the interconnecting side alternates such that two adjacent active portions form an S shape. Alternatively put, an active portion comprises two sectorialy arranged radially extending portions, which are serially interconnected with neighbouring active portions. The radially extending portions generally overlap providing a high current density and thus magnetic field strength, an example of which is illustrated in FIG. 4c. In particular, to achieve the same polarity of the magnetic field the direction of the current through overlapping radially extending portions is this same. For the superposed active portions distributed on different faces: the radially extending portions can be interconnected on one face proximal a periphery of the board, the radially extending portions can be interconnected on another face proximal a centre of the board, an example of which is illustrated in FIG. 4c.

The active portions 48 may comprise various other arrangements (not show and including for the first and second embodiment stator), for example, they may be arranged in a substantially rectangular shape, with a via arranged at an interior and outer of said rectangle for connection.

The processor 36 is configured to control the current applied through the phases. The angular frequency of the generated magnetic field may be variable and/or constant, i.e. a phase locked loop, with a reference frequency. The position of the rotary agitator 8 can be commutated by position sensors such as an: optical encoder; magnetic encoder (e.g. a resolver, synchro etc.); hall effect sensor, with the latter being preferable due to cost and size.

The aforedescribed stator may be incorporated in electrically rotating machines other than the appliance for foaming a liquid described herein. For example, the electrical rotating machine may comprise a motor, such as a pancake or axial rotor motor. The electrical rotating machine may alternatively comprise an electrical generator.

LIST OF REFERENCES

2 Appliance
  4 Base unit
    10 Housing
      20 Body
      22 Base
    12 Container mounting portion
    14 Agitation system
      24 Stator
        44 Circuit board
          52 Face -continued

LIST OF REFERENCES

46 Electrically conductive portion
          48 Active portion
          50 Vias
    26 agitator magnets
    28 agitation portion (of agitator 8)
    30 Core
    16 Heater
    18 Control system
      32 User interface
      34 Sensors
      36 Processor
      38 Power supply
6 Container
8 Rotary Agitator
  40 Body
  42 Support portion
  26 agitator magnets (of agitation system 14)
  28 agitation portion (of agitation system 14)

The invention claimed is:

1. A method of foaming a liquid for consumption using an appliance comprising a container mounting portion to mount thereto a container to contain the liquid; an agitation system configured to foam the liquid, the system comprising a stator arranged external a mounted container, the stator configured to generate a rotating magnetic field for transmission of torque to rotate a rotary agitator arranged in the mounted container; and the stator comprising at a circuit board with electrically conductive portions formed thereon, wherein the electrically conductive portions are connected with at least a two phase configuration, each phase being arranged such that a face of the circuit board comprising a phase comprises a single phase only, the method comprising:
    generating the rotating magnetic field by applying electrical energy to the electrically conductive portions of the stator formed on the circuit board; and
    rotating the rotary agitator arranged in the container for containing the liquid by applying the torque from said field to the rotary agitator.

2. The method according to claim 1, wherein the electrically conductive portions are arranged into active portions that each generate a magnetic pole for the rotating magnetic field.

3. The method according to claim 1, wherein the stator comprises an additional circuit board arranged as a laminate with the circuit board.

4. The method according to claim 1, wherein the electrically conductive portions of each phase are complimentary in shape to each other and are rotationally offset to each other.

5. The method according to claim 1, wherein the stator extends over a portion of a base of the container.

* * * * *